(12) United States Patent
Eriksson

(10) Patent No.: US 7,017,516 B2
(45) Date of Patent: Mar. 28, 2006

(54) ROTARY PARLOUR FOR MILKING OF ANIMALS

(75) Inventor: Mattias Eriksson, Sundsvall (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/297,231

(22) PCT Filed: May 31, 2001

(86) PCT No.: PCT/SE01/01224

§ 371 (c)(1),
(2), (4) Date: Jan. 10, 2003

(87) PCT Pub. No.: WO01/91545

PCT Pub. Date: Dec. 6, 2001

(65) Prior Publication Data

US 2003/0183173 A1  Oct. 2, 2003

(30) Foreign Application Priority Data

Jun. 2, 2000 (SE) .................................. 0002068

(51) Int. Cl.
*A01J 5/03* (2006.01)

(52) U.S. Cl. .................................. 119/14.04; 198/852

(58) Field of Classification Search ............. 119/14.01, 119/14.02, 14.03, 14.04; 198/852; 52/64, 52/65; A01J 5/003, 5/017
See application file for complete search history.

(56) References Cited

U.S. PATENT DOCUMENTS

| | | | | |
|---|---|---|---|---|
| 2,619,843 A | * | 12/1952 | Kampfer | 198/852 |
| 3,095,854 A | * | 7/1963 | Bott et al. | 119/14.04 |
| 3,116,713 A | * | 1/1964 | Darling | 119/14.04 |
| 3,399,758 A | * | 9/1968 | Karr | 198/832 |
| 3,554,360 A | * | 1/1971 | Bildsoe | 198/833 |
| 3,765,373 A | * | 10/1973 | Phillips | 119/14.04 |
| 5,782,738 A | | 7/1998 | Bowers | |
| 6,105,536 A | * | 8/2000 | DeWaard | 119/14.04 |

FOREIGN PATENT DOCUMENTS

| | | |
|---|---|---|
| AU | B-48943/93 | 12/1992 |
| EP | 689762 A1 * | 1/1996 |
| WO | WO 95/33367 | 12/1995 |
| WO | WO 00/74472 | 12/2000 |

* cited by examiner

Primary Examiner—Teri Pham Luu
Assistant Examiner—Susan C. Alimenti
(74) Attorney, Agent, or Firm—Hovey Williams LLP

(57) ABSTRACT

The invention relates to a rotary parlour for milking of animals. The parlour comprises a rotary platform (3) arranged to constitute a support surface for the animals, stalling means arranged to divide the platform (3) into stalls for receiving individual animals (1), driving means arranged to rotate the platform (3) and milking means (11) arranged to be attached to the animals (1). The platform (3) comprises a number of platform modules (8) each having a front edge (9) connected to a rear edge (10) of another platform module (8) at a determined angle of at least two possible angles in relation to each other in such a manner that the platform (3) obtains an annular extension having a size related to said determined angle.

20 Claims, 5 Drawing Sheets

ROTARY PARLOUR FOR MILKING OF ANIMALS

THE BACKGROUND OF THE INVENTION AND PRIOR ART

The present invention relates to a rotary parlour for milking of animals, wherein the parlour comprises a rotary platform arranged to constitute a support surface for the animals, stalling means arranged to divide the platform into stalls for receiving individual animals, driving means arranged to rotate the platform and milking means arranged to be attached to the animals.

Principally, rotary parlours are used for milking cows and to reduce the working time for the operators. The parlours have an automatic cow entry and exit, which eliminates the working time for the operators when controlling the moving of the cows to and from the stalls. There are two types of rotary parlours, internal rotary parlours, where the cows face outwards and the operators work from the inside of the platform, and external rotary parlours, where the cows face inwards and the operators work from the outside of the platform.

The construction and size of the rotary parlour must be suited to the requirements of individual farmers. The size of the rotary platform must, for example, be adapted to the farmer's available space and number of cows. A rotary parlour arranged to receive about 20 to 40 cows is too large to be transported. Consequently, the assembly of the parlours in situ is required. In order to reduce the manufacturing costs of rotary parlours, it is important to reduce the number of included parts and the assembly time.

SUMMARY OF THE INVENTION

The object of the present invention is to achieve a rotary parlour for milking of animals of the initial kind, which is able to be constructed in different sizes in a simple way and to relatively low costs.

This object is achieved by the rotary parlour initially defined, which is characterised in that the platform comprises a number of platform modules each having a front edge connected to a rear edge of another platform module at a determined angle of at least two possible angles in relation to each other in such a manner that the platform obtains an annular extension having a size related to said determined angle. By the front and rear edges of the platform module is meant the respective front and rear edges of the platform module with respect to the rotary direction of the platform. The platform modules may be connected to each other in a great number of angles and preferably in a continuous way. By using such platform modules, it is possible to construct circular platforms of substantially arbitrary sizes. Advantageously, the platform modules are identical and may therefore be manufactured in large quantity to low costs. The platform modules have a support surface provided with an adequate friction to prevent accidents and a strength enabling a stable support of the animals. The platform modules may be manufactured of a suitable material as, for example, plastics, steel or concrete.

According to an embodiment of the invention, the front and rear edges of the platform modules have supplementary shapes. By such shapes, it is possible to provide a substantially smooth support surface along the whole extension of the annular platform. Consequently, irregularities and gaps occurring between the front and rear edges of adjacent platform modules are eliminated. A platform having a substantially smooth support surface has no obstacles on which the animals may stumble. A smooth surface is also easy to clean. Preferably, one of said edges is substantially semicircularly convex and the other edge is substantially semicircularly concave. Edges having such shapes are supplementary independently of the actual angle between the platform modules. By using such platform modules, platforms of arbitrary sizes and having a substantially smooth surface, may be manufactured.

According to a further embodiment of the invention, the determined angle between the front and rear edges of adjacent platform modules is established by at least one coupling member extending between said platform modules. Such a coupling member may be an elongated joint having its ends rigidly connected to the respective adjacent platform module. Preferably, each platform module has at one of said front and rear edges at least one hole receiving a first end of the coupling member in a fixed position and at the other of said edges a curved elongated aperture receiving a second end of the coupling member in a variable position along the extension of the aperture.

According to a further embodiment of the invention, each of the platform modules has an underlying framework unit. Such framework units are useable in order to construct rotary parlour of different sizes. The object of the framework units is to minimise the deformation of the platform depending on the weight of the animals. Advantageously, the framework is used of standardised beams, like U-beams and L-beams, welded or screwed together. Preferably, a coupling device may extend between said framework units establishing the determined angle between the front and rear edges of adjacent platform modules. The coupling device may comprise means as, for example, wedges for connecting the adjacent framework units in different angles in relation to each other and thereby the supported platform modules. Advantageously, the underlying framework comprises a rail device, which may be supported on a number of rollers located under the platform. The rollers may be rotary arranged in stands positioned on the floor under the platform. Consequently, the platform will rotate on the rollers with a low friction and with a low noise.

According to a further embodiment of the invention, the annular platform may have its inner circumference edge located at a higher level than its outer circumference edge. Preferably, the annular platform has a plane surface sloping about 3° in relation to a horizontal plane. This simplifies the cleaning of the platform because water and dirt rinse off easily. By such a sloping of the platform, it will be a small difference in height between the connected front and rear edges of the platform modules. The value of the difference in height varies in relation to the angle between the platforms modules. If, for example, the shape of the surface of the platform modules is designed to have no difference in height between the platform modules at a manufactured platform comprising 23 platform modules, the difference in height for a manufactured platform of 16 or 40 such platform modules is less than 2,5 mm.

According to a further embodiment of the invention, the driving means may comprise at least one driving wheel located under the platform and arranged to drive the platform by a friction-plate rigidly mounted to the underside of the platform. A suitable drive motor is arranged to drive the driving wheel, which has an appropriate surface engaging said friction-plate. By using such driving means, the platform obtains a simple and reliable rotary motion.

According to a further embodiment of the invention, the stalling means may comprise a bar arrangement provided on each of the platform modules. The purpose of the bar arrangement is to create a good positioning of the animal during the milking operation. Preferably, each platform module is provided with an identical bar arrangement. Thereby, such a bar arrangement may be articulately connected to identical bar arrangements on the adjacent platform modules. The stalling means may be arranged to provide the animals in a herringbone pattern along the annular platform. In this case, the animals may be placed closed together on the platform. Other types of stalling pattern for the animals are also possible to use.

According to a further embodiment of the invention, each of the platform modules may comprise milking means and a feeding trough. Thereby, a simple attachment of the milking means, as a cluster, to the animal is obtained. A feeding trough attracts the animal and facilitates the positioning of the animal in the stall. The milking period is also a suitable occasion to feed the animals, which by the feeding becomes relaxed during the milking operation.

According to a further embodiment of the invention, the rotary parlour comprises an entry for the animals to the platform at its outer circumference and an exit for the animals from the annular platform at its outer circumference, wherein the exit is located beside the entry. Consequently, the animals rotate nearly 360° during the milking operation. The entry may have a gate, which open periodically in response to the position of the platform and is arranged to close after an animal has entered the platform and moved into a stall.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED EMBODIMENTS OF THE INVENTION

Figure 1:
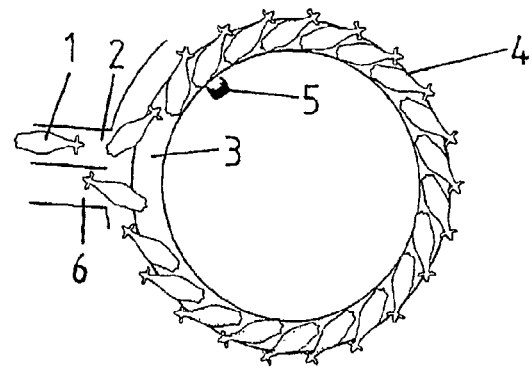
FIG. 1 shows a rotary parlour for milking of cows.

FIG. 1 shows a rotary parlour for milking of cows 1. The cows 1 are arranged to walk through an entry 2 to enter a rotary platform 3. The platform 3 is annular and includes stalling means arranged to position the cows 1 in stalls 4 in a herringbone pattern. Each stall 4 has a milking unit, not shown, arranged to be attached to the cow 1. In FIG. 1, the cows face outwards from the stalls 4 and an operator 5 works from the inside of the annular platform 3. The cows rotate nearly 360° on the platform 3 during the milking operation. Then, the cow 1 leaves the stall 4 and the platform 3 through an exit 6 after having been milked and fed during the milking operation.

Figure 2:
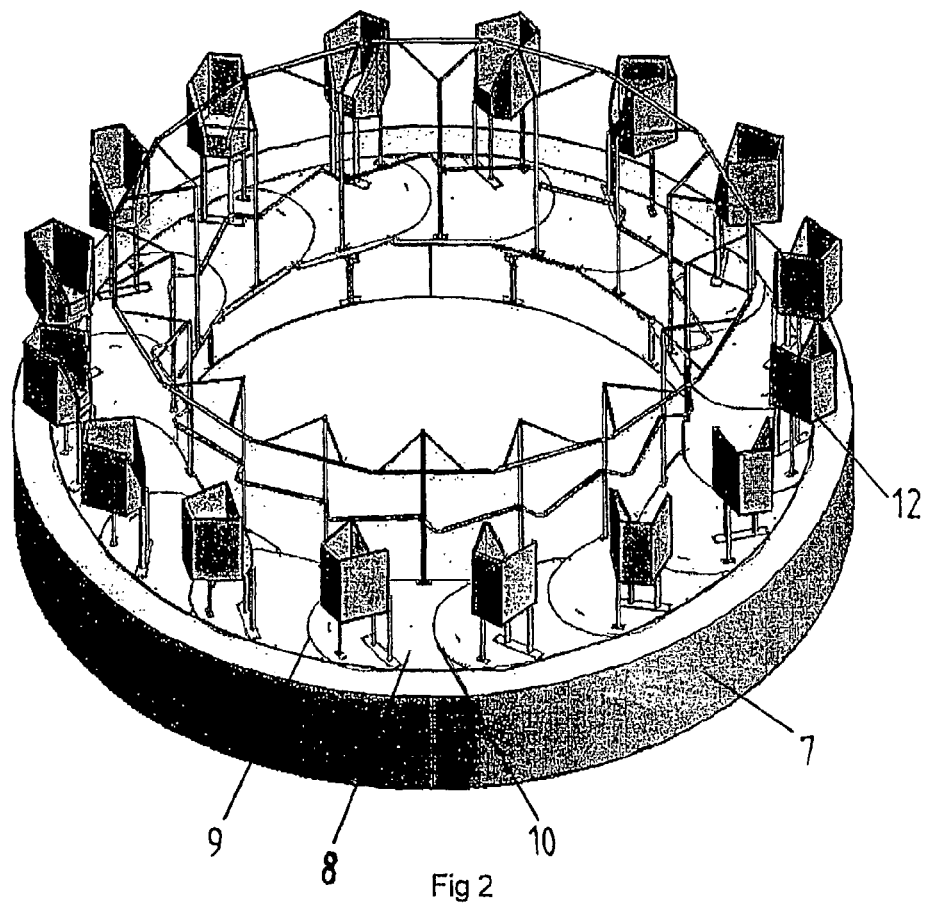
FIG. 2 shows a rotary parlour for milking of cows according to the invention.

In FIG. 2 shows a rotary parlour according to the invention. The rotary parlour comprises a pit 7 arranged to receive the platform 3. The pit 7 is cast and has an inner circular wall, which has to have a smooth surface to keep the platform 3 in a proper position in the pit 7. The platform 3 comprises a number of platform modules 8 having a front edge 9 connected to a rear edge 10 of another platform module. The platform modules 8 are possible to connect to each other at a determined angle of a plurality of possible angles in such a manner that the platform 3 obtains an annular extension having a size related to the number of platform modules 8 and the determined angle between the platform modules 8. Each of the platform modules 8 comprises stalling means in form of a bar arrangement. The bar arrangement is arranged to divide the platform 3 into stalls 4 receiving a cow. The bar arrangements position the cows in a herringbone pattern along the annular platform 3 during the milking operation. Each of the platform modules 8 comprises milking means comprising a cluster 11. The cluster 11 is attached to the cow of the operator 5 after the cow has entered the stall. The cluster 11 is automatically removed from the cow before the cow reaches the exit 6. Each of the platform modules 8 comprises a feeding trough 12. The feeding troughs 12 are arranged to attract the cows 1 and hence facilitate the positioning of the cows 1 in the stall 4. The milking period is a suitable occasion to feed the animals 1 and the cows become calm by the feeding.

Figure 3:
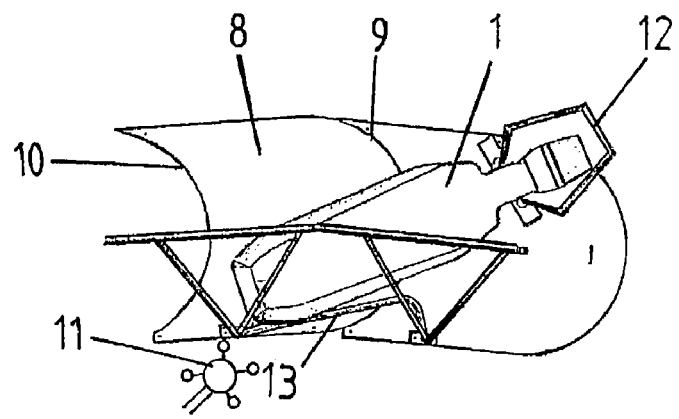
FIG. 3 shows a part of the rotary parlour according to the invention and having a cow positioned in a stall.
Figure 4:
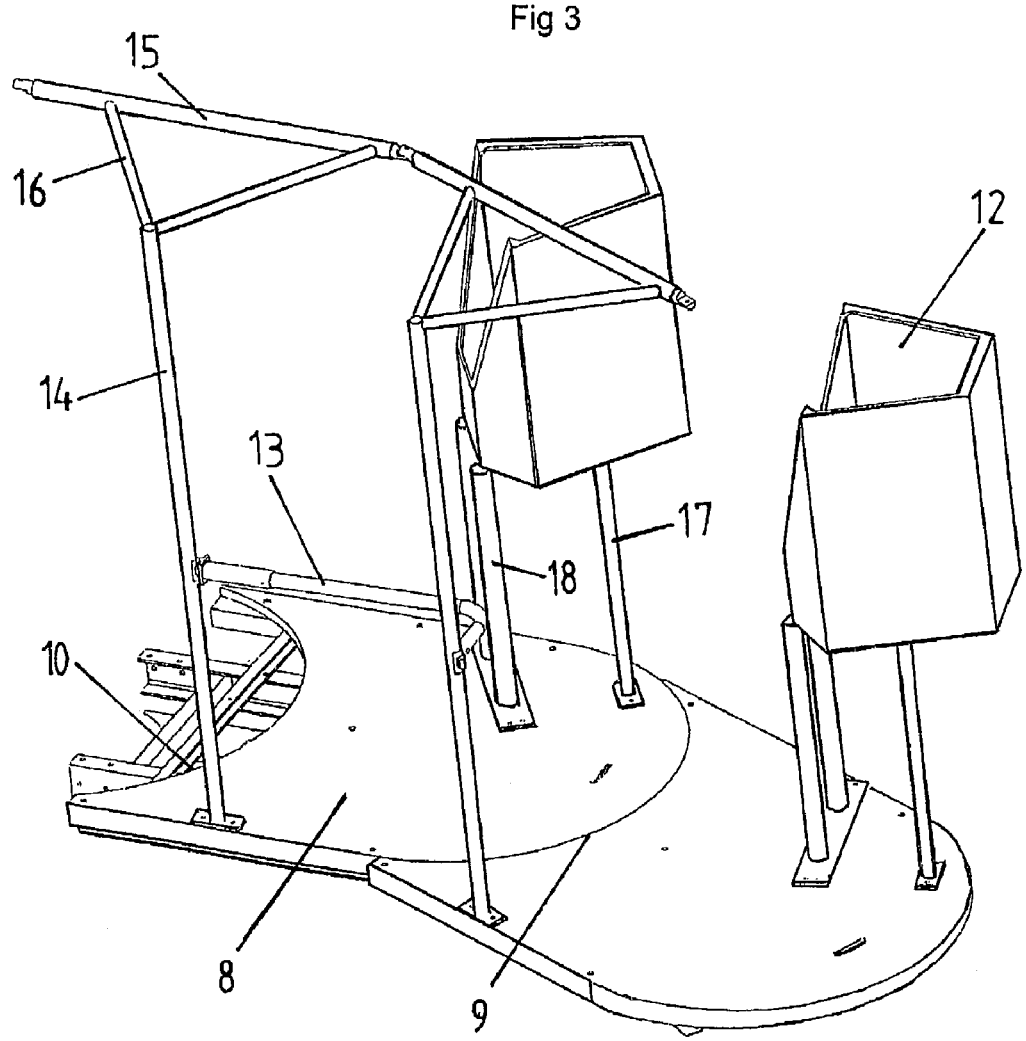
FIG. 4 shows a perspective view of a part of the rotary parlour.

FIG. 3 shows a cow 1 in a milking position. The bar arrangement comprises a rumprail 13 used to positioning the cow correctly in the stall 4. The rumprail 13 also works as a protection for the operator 5 and prevents the cow from accidentally falling or stepping into the centre of the parlour. The rumprail 13 includes two extensible parts enabling adjustment of the length of the rumprail at different connection angles between the platform modules 8. The rumprails 13 are at their ends connected to posts 14 fixedly attached to the platforms 8. The bar arrangement also comprises rods 15, 16 arranged to stiffen the rumprails 13. A rod 15 is fixedly attached to each platform module 8 by two rods 16 and a post 14. The rods 15 are articulated to each other at the centre of the platform 3 above the cows. Each of the feeding troughs 12 is supported on the platform modules 8 by means of a post 17 and supporting means 18 arranged under the front of the feeding through 12.

Figure 5:
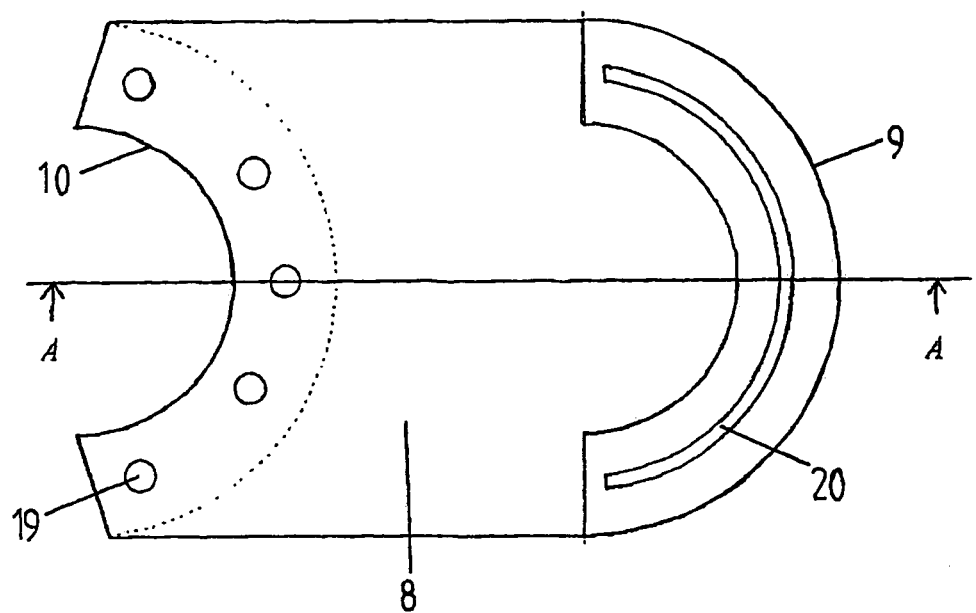
FIG. 5 shows a first embodiment of a coupling member arranged between two platform modules.
Figure 5A:
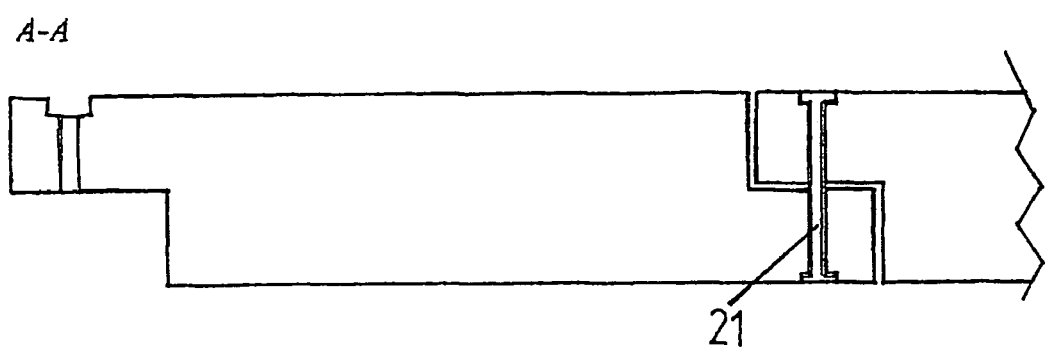
FIG. 5A shows a vertical cross sectional view through two platform modules taken along line A—A of FIG. 5, showing the first embodiment of a coupling member.

FIG. 5 and FIG. 5A shows an arrangement connecting the platform modules 8 in a variable angle in relation to each other. The platform module 8 having a front edge 9, which is semicircularly convex, and a rear edge 10, which is semicircularly concave. Thereby, the front edges 8 and the rear edges 9 have supplementary shapes also when two adjacent platform modules 8 are turned to different angles relatively to each other. An upper semicircular part at the front edge 9 of the platform modules 8 is removed as a semicircular lower supplementary part at the rear edge 10. In order to fix the platform modules 8 in a desired position, the platform modules 8 have an elongated curved aperture 20 at the front edge and a plurality of holes 19 at the rear edge 10. Coupling members 21 are inserted in the holes 19 of a platform module 8 and in the aperture 20 of an adjacent platform module 8 in order to rigidly connect the platform modules 8 in a desired position in relation to each other. Such coupling 21 members may comprise a bolt and a nut.

Figure 6:
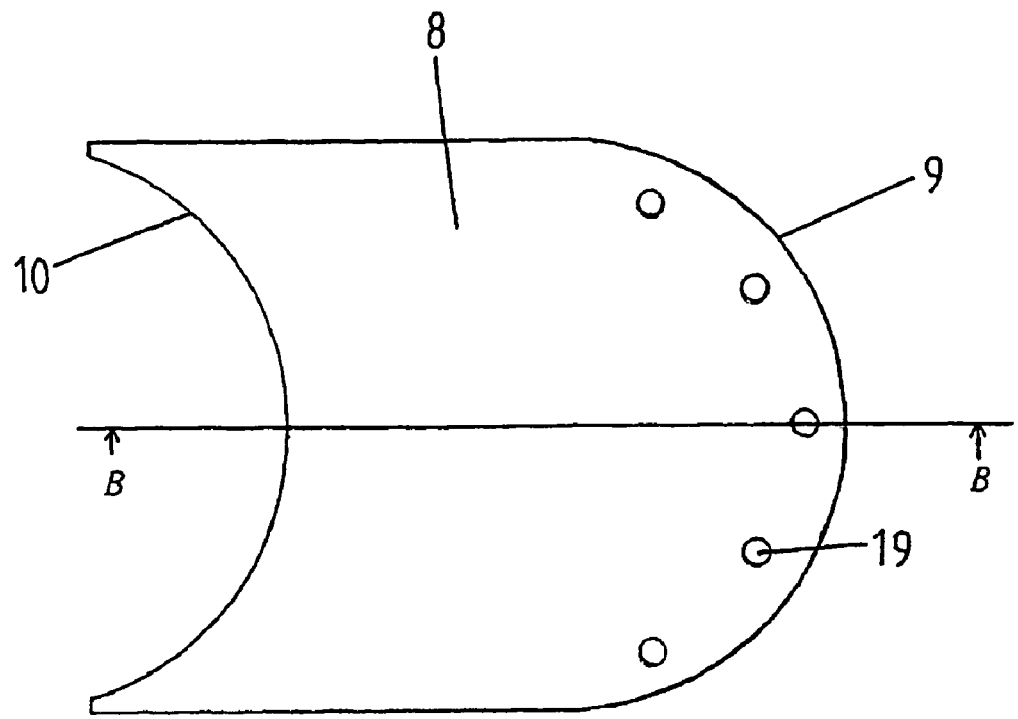
FIG. 6 shows a second embodiment of a coupling member arranged between two platform modules.
Figure 6B:
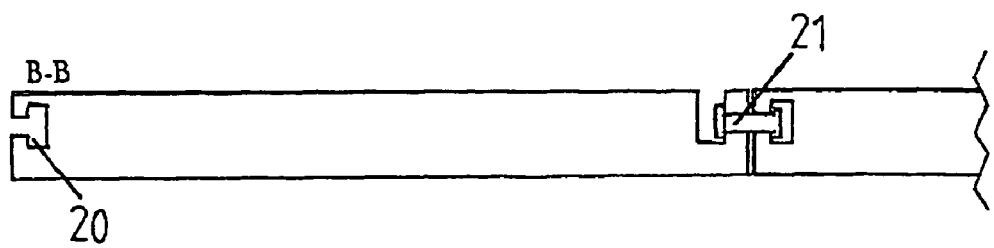
FIG. 6A shows a vertical cross sectional view through through two platform modules taken along line B—B of FIG. 6, showing the second embodiment of a coupling member.

FIG. 6 and FIG. 6A shows an alternative arrangement connecting the platform modules 8 in a variable angle in relation to each other. The platform module 8 comprises at its front edge a plurality of holes 19 extending downwards in the platform module 8. Each of the holes 19 has a passage extruding outwardly through the lateral surface of the front edge 9. The platform module 8 comprises at its rear edge 10 an elongated aperture 20 through the lateral surface of the rear edges 10. A coupling member 21 is arranged to be inserted in the holes 19 of a platform module 8 and in the aperture 20 of an adjacent platform module 8. Thereby, the coupling member 21 extends between the platform modules 8 and connects them rigidly at a desired angular position against each other.

Figure 7:
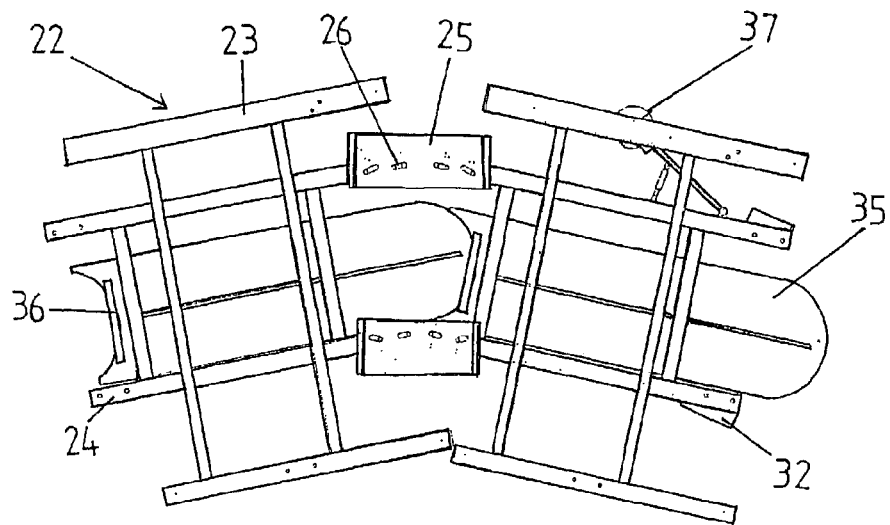
FIG. 7 shows a view from the above of framework units arranged under the platform modules.

In FIG. 7, two framework units 22 connected to each other are shown. The framework units 22 are arranged to support the platform modules 8 from the underside. Each of the platform modules 8 is loosely provided on an underlying framework unit 22. The framework units 22 are constructed of a number of beams 23 welded together. The framework units 22 also comprise two rail members 24 arranged in parallel. A coupling device 25 is used to connect the rail members 24 of adjacent framework units 22 to each other. By using such a coupling device 25 between adjacent framework units 22, the platform modules 8 have not to be connected to each other as described in FIGS. 5 and 6.

Figure 8:
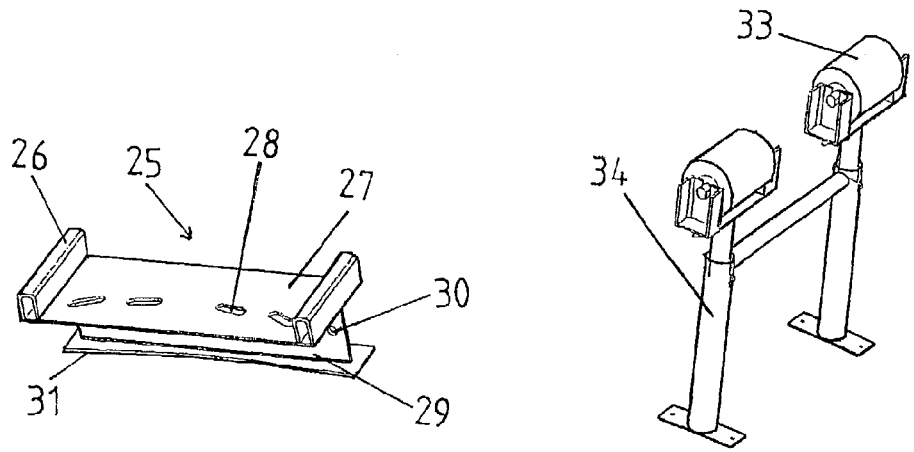
FIG. 8 shows a perspective view of a coupling device arranged to act between two framework units.
Figure 9:
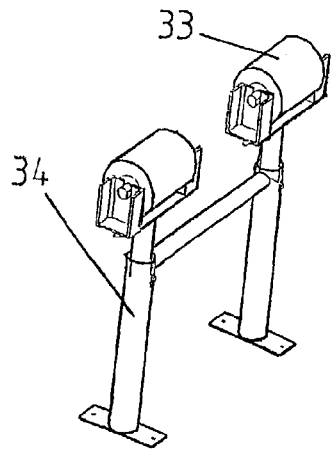
FIG. 9 shows a perspective view of a stand equipped with support rollers.

The coupling device 25 is shown in detail, in FIG. 8. At the top of the coupling device 25 there are two bent sheets 26 welded on a horizontal plate 27. The horizontal plate 27 comprises a plurality of elongated holes 28. The bent sheets 26 are used to support the platform modules 8, but they also prevent the coupling device 25 from wrenching. A vertical plate 29 comprising holes 30 is arranged to connect the horizontal upper plate 27 to a horizontally arranged lower plate 31. The lower plate 31 has a bottom surface arranged to form an extension between the rail members 24 in order to constitute a continuously rail surface on the underside of the framework units 22. For the purpose to arrange the framework units 22 in a connection angle in relation to each other, wedges 32 are used to be arranged between the vertical plate 29 of the coupling device 25 and the rail members 24. The wedges 32 have holes on each side to fit with the holes 30 of the plate 29 of the coupling device 25 and the rail members 24. Bolts are provided in the holes and connect thereby two adjacent the rail members 24 in a connection angle in relation to each other. In order to provide different connection angles between the framework units 22 wedges 32 of different sizes are used.

The rail members 24 and the bottom surface of the coupling device 25 shapes a continuously rail surface, which is substantially smooth. The rail surface is supported by a number of rollers 33 rotary provided on stands 34, which are fixedly arranged on a floor located under the platform 3. By using such rollers 33, the platform 3 is allowed to rotate silently and with a minimum of friction.

Each of the framework units 22 also comprises a friction-plate 35. The friction-plates 35 of adjacent framework units 22 are connected to each other by a transverse beam 36, which locks a front portion of a friction-plate 35 to a rear portion of the adjacent friction-plate 35. Thereby, the friction-plates 35 provide a continuous surface at the bottom. In order to rotate the platform 3, a driver motor is arranged to drive a driving wheel, which is arranged to be in contact with the friction-plates 35. Thus, the driving wheel is able to rotate the platform with a desired rotary speed. The framework units 22 also comprise a pit-edge wheel 37. The pit-edge wheel 37 is arranged to follow the inner lateral surface of the pit 7 and force the platform to stay in place even after a heavy push from a cow.

The invention is not restricted to the described embodiments in the figures, but may be varied freely within the scope of the claims.

The invention claimed is:

1. A rotary parlour for milking of cows, wherein the parlour comprises:
    a rotary platform arranged to constitute a support surface for the cows, wherein the platform further comprises a plurality of platform modules each having a front edge and a rear edge:
    stalling means arranged to divide the platform into stalls for receiving individual cows during milking;
    driving means arranged to rotate the platform;
    milking means arranged to be attached to the cows; and
    a plurality of coupling members which rigidly connect the front edge of each platform module to a rear edge of another adjacent platform module at a determined angle of at least two possible angles in relation to each other in such a manner that the platform obtains an annular extension having a size related to said determined angle.

2. A device according to claim 1, wherein the front edge and rear edge of the platform modules have supplementary shapes.

3. A device according to claim 2, wherein one of said front and rear edges is substantially semicircularly convex and the other of said front and rear edges is substantially semicircularly concave.

4. A device according to claim 1, wherein the determined connection angle between the front and rear edges of adjacent platform modules is established by at least one coupling member extending between said platform modules.

5. A device according to claim 4, wherein each platform module has at least at one of said front and rear edges, at least one hole receiving a first end of the coupling member in a fixed position and at the other of said front and rear edges a curved elongated aperture receiving a second end of the coupling member in a variable position along the extension of the aperture.

6. A device according to claim 1, wherein each of the platform modules has an underlying framework unit.

7. A device according to claim 6, wherein a coupling device extending between said framework units establishes said connection angle between the front and rear edges of adjacent platform modules.

8. A device according to claim 6, wherein the underlying framework units comprise a rail device arranged to be supported on a number of rollers located under the platform.

9. A device according to claim 1, wherein the platform is annular and has its inner, circumference edge located at a higher level than its outer circumference edge.

10. A device according to claim 1, wherein the driving means comprises at least one driving wheel located under the platform and arranged to drive the platform by contact with a friction-plate fixedly mounted on the underside of the platform.

11. A device according to claim 1, wherein the stalling means comprises a bar arrangement on the adjacent platform modules.

12. A device according to claim 11, wherein each bar arrangement is articulately connected to a bar arrangement on the adjacent platform modules.

13. A device according to claim 11, wherein the platform is annular and the stalling means is arranged to position the cows in a herringbone pattern along the annular platform.

14. A device according to claim 1, wherein each of the platform modules comprises a milking unit.

15. A device according to claim 1, wherein each of the platform modules comprises a feeding trough.

16. A device according to claim 1, wherein the platform is annular and the rotary parlour comprises an entry for the cows to the annular platform.

17. A device according to claim 1, wherein the platform is annular and the rotary parlour comprises an exit for the animals cows from the annular platform.

18. A device according to claim 7, wherein the underlying framework units comprise a rail device arranged to be supported on a number of rollers located under the platform.

19. A device according to claim 12, wherein the platform is annular and the stalling means is arranged to position the animals in a herringbone pattern along the annular platform.

20. A rotary parlour for milking of cows, wherein the parlour comprises:

a rotary platform arranged to constitute a support surface for the cows;
stalling means arranged to divide the platform into stalls for receiving individual cows during milking;
driving means arranged to rotate the platform;
milking means arranged to be attached to the cows; and
wherein the platform further comprises a plurality of platform modules, each of said platform modules having an underlying framework unit, and further including a plurality of coupling devices, one of said coupling devices extending between framework units of adjacent modules for connecting a front edge of one module to a rear edge of another adjacent platform module at a determined angle of at least two possible connection angles in relation to each other whereby the coupling device establishes the determined angle and the platform comprised of said platform modules has an annular extension having a size related to said determined angle.

* * * * *